United States Patent [19]

Oros

[11] 4,033,851
[45] July 5, 1977

[54] A.C. HYDROELECTROSTATIC PRECIPITATOR

[75] Inventor: Richard G. Oros, Grand Rapids, Mich.

[73] Assignees: C&O Railroad Company, Cleveland, Ohio; B&O Railroad Company, Baltimore, Md.

[22] Filed: June 25, 1976

[21] Appl. No.: 699,969

Related U.S. Application Data

[63] Continuation of Ser. No. 450,215, March 11, 1974, abandoned.

[52] U.S. Cl. .............................. 204/302; 204/306
[51] Int. Cl.² ................................. C10G 33/02
[58] Field of Search ..................... 204/186–191, 204/302–308

[56] References Cited
UNITED STATES PATENTS

| | | | |
|---|---|---|---|
| 1,405,121 | 1/1922 | Harris | 204/306 |
| 1,838,922 | 12/1931 | Fisher | 204/302 |
| 3,205,160 | 9/1965 | Stenzel et al. | 204/302 |

*Primary Examiner*—John H. Mack
*Assistant Examiner*—Aaron Weisstuch
*Attorney, Agent, or Firm*—Cushman, Darby & Cushman

[57] ABSTRACT

A method and apparatus for separating oil from water in a raw mixture in which the mixture enters a separator tank having within it electrodes to which an A.C. voltage is applied to cause separation of the oil and water. In one embodiment, two sets of electrodes extend to different lengths in the tanks with a high voltage being applied to the shorter electrodes and a low voltage to the longer. A valve can be disposed in the water outlet pipe to be opened to drain water whenever the sensed conductivity near the tank bottom exceeds a given value. The tank can be immersed in a larger tank and can be provided with porous walls through which the raw mixture enters and the separated oil and water leave. The electrodes can comprise a center electrode and a plurality of high voltage electrodes disposed about said center electrode with a high voltage then applied between said center electrode and the circumferentially disposed electrodes.

7 Claims, 5 Drawing Figures

A.C. HYDROELECTROSTATIC PRECIPITATOR

This is a continuation of application Ser. No. 450,215 filed Mar. 11, 1974 now abandoned.

BRIEF DESCRIPTION OF THE PRIOR ART AND SUMMARY OF THE INVENTION

The invention relates to a method and apparatus for separating oil from water in a raw mixture.

Mixtures of water with oil, grease and other petroleum products are a frequent byproduct of many industrial processes. Such mixtures can no longer be simply dumped in river, stream or ocean because the mixture causes environmental degradation which is no longer acceptable. Further, it is important that the petroleum products in the mixture be separated from the water so that they can be chemically treated and reused. Both the high price of petroleum products and their relative current scarcity and limited supply thereof make such reclamation imperative.

The present invention relates to a method and apparatus by which oil can be quickly, simply and effectively separated from water in a raw mixture. The water can then be treated in a conventional water treatment plant and the oil chemically processed according to known techniques to produce products which can be reused.

It is known that water and oil emulsions, for example containing natural salt, can be broken so as to separate the water and salt from the crude oil. For example in chapter 8, "Treatment of Recovered Oil Emulsions", of *Manual on Disposal of Refinery Waste, Vol. on Liquid Waste*, a method is described in which the emulsion is passed between two electrodes which are subjected to a high potential pulsating current. This results in coalescence of the water globules as a result of the high potential until these globules are large enough to settle by gravity, thus separating the bouyant oil based materials from the less bouyant water.

The present invention, as discussed in detail below, describes an apparatus and method in which a high electrical potential is employed for effecting separation of oil and water. In one embodiment, the raw mixture flows into a separator tank through an inlet which is disposed about one third of the way between the bottom and top of the tank. The oil outlet is arranged near the top of the tank while the water outlet is disposed at the tank bottom. Two pairs of non-conductive bars suspend wires which serve as electrodes. For a first pair of the bars, the electrode wires are of a length so as to extend into the lower portion of the tank so that the raw mixture entering the tank encounters these extending electrodes first. A low potential is generated between the electrodes on one bar of this first pair and the electrodes on the other bar of this first pair so that the resulting current flow effects separation. The wires extending from the other pair of bars do not extend as far as the electrodes of the first pair so that the potential field created by the electrodes attached to this second pair of bars is encountered by the oil mixture after encountering the field created by the electrodes of the first pair of bars. The electrodes of the second pair of bars are connected to a high potential for completing separation of the oil and water. The water outlet in the bottom of the tank is connected to a conventional raiser pipe.

According to a further embodiment, a sensor for detecting the conductivity of the liquid adjacent the bottom of the tank is connected to a relay which shifts from a first to a second electrical condition when that conductivity is greater than appredetermined value. This relay is in turn connected to a pull solenoid which is in turn coupled to a valve in the outlet pipe so that the valve is opened to permit the water to flow out of the tank whenever the pull solenoid is actuated by the relay. Since water has a much higher conductivity than oil or the raw mixture, when oil reaches the sensor level the valve in the water outlet pipe is automatically closed. The sensor may comprise a pair of wires which extend through the tank to a location near the bottom and at least one of which is insulated except near the bottom where conductivity is to be detected.

According to a third embodiment of the invention, three sets of electrodes extend in the first chamber of a tank, that chamber including an inlet for the raw mixture, an outlet for the oil near the top and an outlet for the water in the bottom. Each set of electrodes comprises a plurality of parallel wires which extend in the first chamber with the sets of electrodes being separated by non-conductive shields which guide flow of the liquid within the tank. Preferably the lowest set of electrodes is connected to a low voltage while the uppermost set of electrodes is connected to a high voltage. The middle set of electrodes is coupled to a high A.C. voltage which is, however, lower than the voltage of the set of electrodes located directly above it. The tank in this third embodiment further includes a separation chamber coupled to the water outlet including a strainer for separating the sludge, which is precipitated as a result of the application of the potential, from the water, which is then removed.

According to further embodiments of this invention, the electrodes include a center electrode and a plurality of high voltage electrodes circumferentially disposed about this center electrode with a high voltage being applied between the center electrode and the circumferencial electrodes. In one arrangement of this type the separator tank can be lowered into a tank car or storage tank having the raw mixture with the mixture circulating through the porous tank and the water and oil being separated by the action of the high potential field. Alternatively, the separator tank can be installed in a feed line from a pump and the resulting output circulated back to the storage tank, minus the water and sludge. A timer can be employed to switch the electrodes periodically between a high and low voltage.

Many other objects and purposes of the invention will become clear from the following detailed description of the drawings.

DETAILED DESCRIPTION OF THE DRAWINGS

Figure 1:
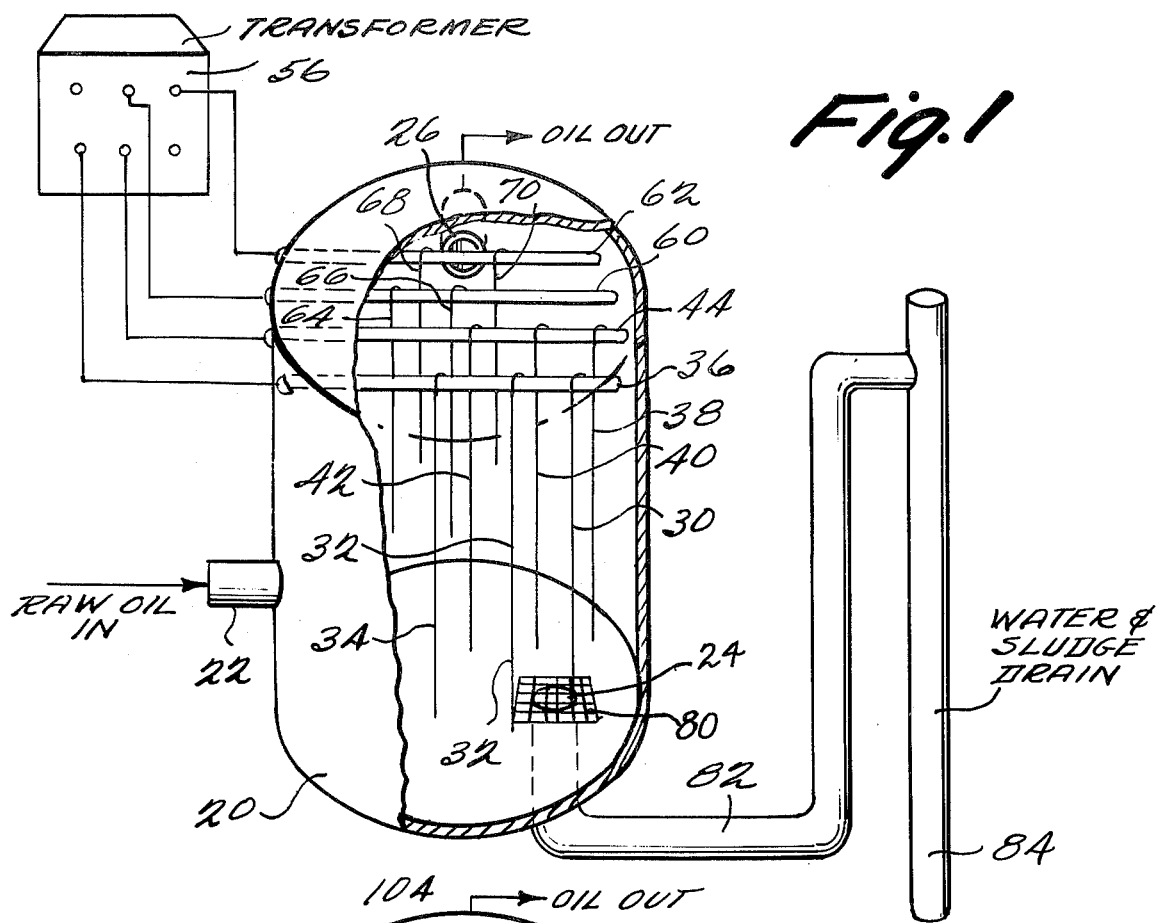
FIG. 1 shows a schematic view of a first embodiment of this invention.

Reference is now made to FIG. 1 which illustrates a first embodiment of the invention of this application. The raw mixture from any suitable source, for example a tank car, flows into a separator tank 20 at a raw mixture inlet 22, which as illustrated, is about one-third of the way between the bottom and top of tank 20. In the embodiment of FIG. 1, tank 20 has a cylindrical configuration and can be made of any size desired to handle whatever volume of material is to be separated. Tank 20 can be constructed of any suitable materials. The raw mixture flows continuously into tank 20 via inlet 22. A water outlet 24 is disposed in the bottom of tank 20 for continuously receiving water which leaves the tank while the separated oil and other petroleum products leave tank 20 at outlet 26 which is disposed near the top of the tank.

As indicated above, two sets of electrodes extend within tank 20 for producing an electrical field which causes separation of water and oil. As can be seen in FIG. 1, four non-conductive, perferably plastic, bars extend in a horizontal plane across tank 20 near the top thereof. The pair of bars furthermost from the oil outlet 26 have attached to them flexible electrical wires which extend downward into the tank past the region where the raw mixture is entering tank 20. Electrodes 30, 32 and 34 extend from non-conductive bar 36 while electrodes 38, 40 and 42 extend from non-conductive bar 44. Electrodes 30, 32 and 34 are connected to one polarity terminal of transformer 56 which supplies a relatively low voltage, for example between 220-440 volts A.C., so that a low potential field is generated between electrodes 30, 32 and 34 and electrodes 36, 38 and 40.

Similarly a plurality of electrodes each extend from non-conductive bar 60 and from non-conductive bar 62. Electrodes 64 and 66 are shown suspended from bar 60, while electrodes 68 and 70 are attached to bar 62. While six electrodes on each of bars 60 and 62 have been found satisfactory, only two on bars 60 and 62 are illustrated in FIG. 1 to avoid cluttering the drawing. Electrodes 64, 66, 68 and 70 only extend downward for a distance which is less than the distance that electrodes 30, 32, 34, 36, 38 and 40 extend. Electrodes 66 and 64 are connected to a further terminal of transformer 56 as are electrodes 68 and 70 so that an A.C. voltage is applied between electrodes 68 and 70 and electrodes 64 and 66 which is of a much higher voltage than the voltage applied to the electrodes suspended from bars 36 and 40. For example, a voltage of 3,000 to 6,000 volts between the electrodes suspended from bar 60 and the electrodes suspended from bar 62 has been found to be satisfactory. By providing two voltage levels and different sets of electrodes a transformer can be employed which has a lower rating and which is less expensive than would be required for applying higher voltages for all the electrodes. Further, it has been found that this arrangement works much faster and is much more satisfactory than a single lower voltage arrangement. By using an A.C. signal rather than a D.C. signal, the reversal of polarity prevents plating out of various materials on the electrodes and keeps them clean.

The potentials created between the various electrodes causes the oil to separate from the water as explained very briefly above. Heavy sludge and other similar particles are precipitated and fall to the bottom of the tank. Screen 80 covers water outlet 24 and prevents this precipitate from entering outlet raiser pipe 82. Above the layer of precipitate a layer of clear water forms. Above this layer of clear water is a layer of combination sludge and water which is being separated. Above this combination of water and sludge is a layer of oil which contains less than 5% water. The oil layer leaves tank 20 via oil outlet 26 while the clear water leaves the tank via outlet 24. The bouyance of the water raises the oil in the tank about a quarter of an inch higher than the water level in the outlet raiser pipe 82, thus preventing the oil from entering the water and sludge drain pipe 84 connected to raiser pipe 82 as schematically illustrated in FIG. 1. If necessary, oil which has been cleaned can be run through the separator tank a second time or repeatedly until all the water is removed from the oil.

Figure 2:
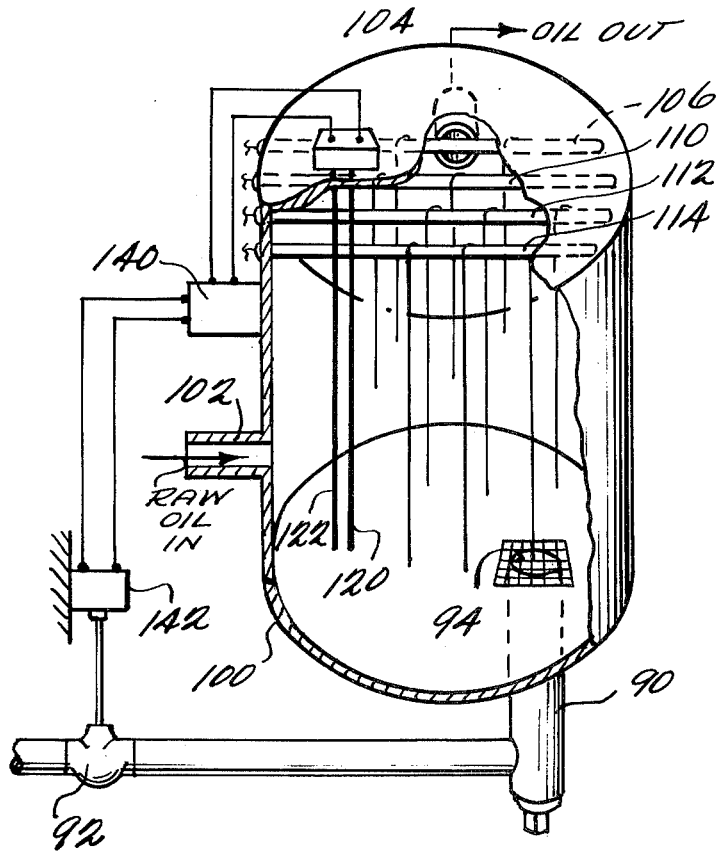
FIG. 2 shows a schematic view of a second embodiment in which the conductivity of the liquid near the bottom of the tank is sensed to control a valve permitting water in the bottom of the tank to flow out therefrom.

Reference is now made to FIG. 2 which illustrates an embodiment similar to FIG. 1 but in which a valve 90 is disposed in outlet pipe 92 which couples to the water outlet 94 of tank 100 to control flow of the water out of the tank. The raw mixture enters tank 100 at inlet 102 as in the embodiment of FIG. 1 and the separated oil leaves at outlet 104. Bars 106, 110, 112 and 114 extend within separator tank 100 and from these bars electrodes hang as in the embodiment in FIG. 1, those electrodes being connected to a suitable power source for applying high and low voltages in the same fashion as in the embodiment of FIG. 1.

However, in addition to the arrangement of FIG. 1, the embodiment of FIG. 2 includes a sensor element comprising two wires 120 and 122 which extend from the top of the tank to a location near the bottom as illustrated. At least one of these wires is insulated over the upper portion of its length so that only the very tips of areas adjacent the tips are bare. A small voltage is impressed between the wires 120 and 122 to produce a signal which indicates the conductivity of the liquid near the bottom of tank 100. When that liquid is water, the conductivity is very high and substantial current flow between electrodes 120 and 122 occurs. When the water level is very low and the oil surrounds the bare portions of wires 120 and 122, conductivity is very low and very little current flow. Wires 120 and 122 are connected to a relay 140 which shifts to an operative position when the conductivity sensed is high, indicating there is water in the bottom of the tank which can be drained. Relay 140 is in turn connected to a conventional pull solenoid 142 which is coupled as illustrated to valve 90 to open that valve whenever relay 140 is activated to draw in water out of tank 100.

Figure 3:
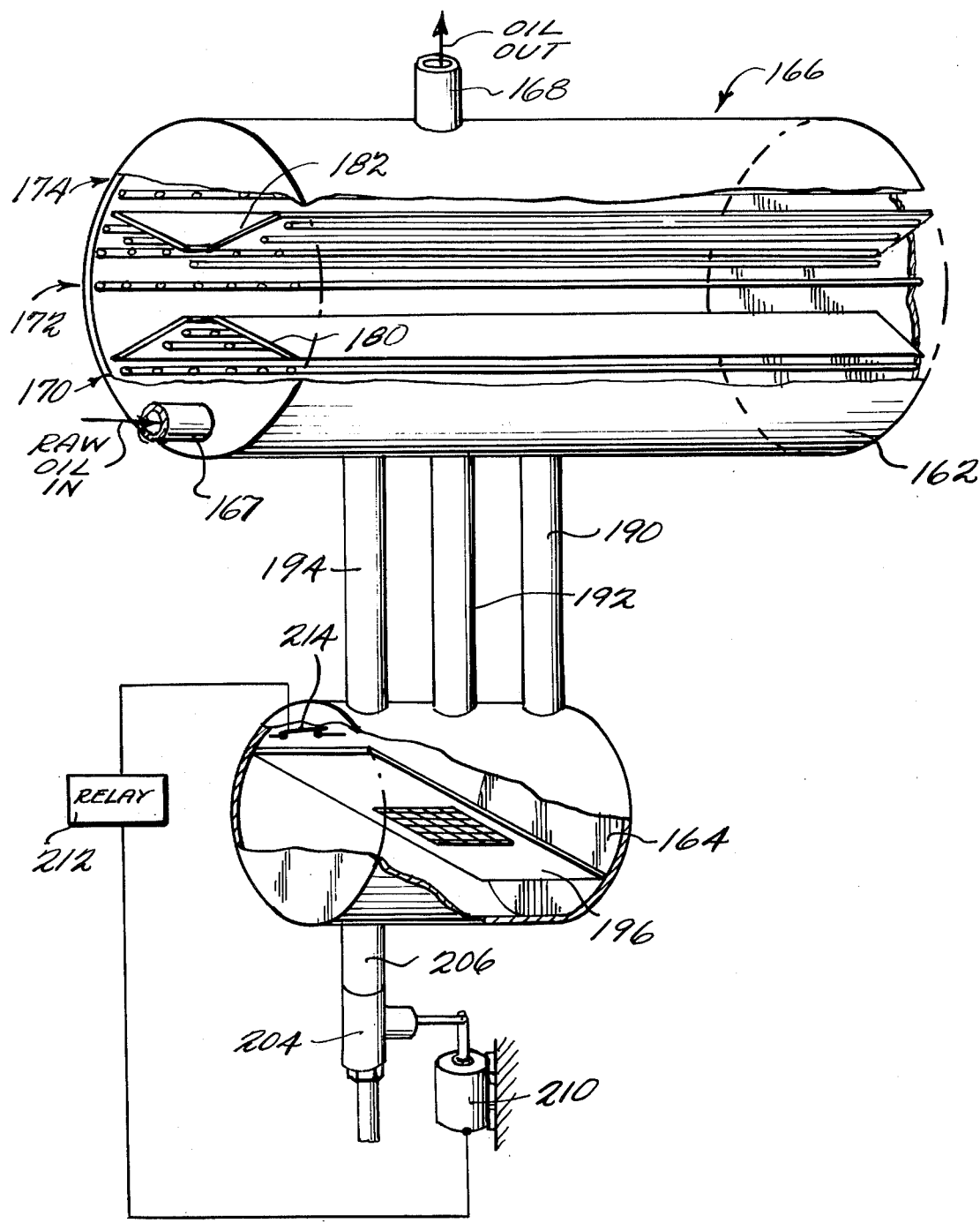
FIG. 3 shows a further embodiment of this invention in which the separator tank is comprised of first and second chambers.

Referring to the embodiment of FIG. 3, the tank 166 is divided to a first chamber 162 and a second chamber 164. The raw mixture flows into chamber 162 at outlet inlet 167 and the separated oil leaves chamber 162 at outlet 168 in the top of chamber 162. A plurality of electrodes extend as illustrated between the sides of chamber 162 and are divided into these separate groups of electrodes labelled 170, 172 and 174. Each of the electrodes in groups 170, 172 and 174 consists of a long conductive wire which is coupled to a voltage source as discussed below. In the embodiment illustrated in FIG. 3 electrode group 170 consists of 11 low voltage electrodes which preferably receive an A.C.

voltage of between 220–440 volts. This voltage extends between certain ones of the electrodes or between the electrodes and the grounded exterior surface of chamber electrodes and the grounded exterior surface of chamber 162. The group of electrodes 172 consists of 15 high voltage electrodes which receive a potential of between 2,000 and 3,000 volts. The group of electrodes 174 consists of 8 high voltage electrodes which receive an A.C. voltage signal of between 3,000 to 7,000 volts.

Separating groups 170, 172 and 174 are respective non-conductive shields 180 and 182 which are concave and convex as illustrated and which have an aperture in the middle as shown for guiding the flow of water to lower chamber 164 via pipes 190, 192 and 194.

In second chamber 164, strainer 196 is provided at an angle as shown to catch the sludge and other particles with the pure water passing out chamber 164 via outlet 206. A valve 204 is disposed in outlet pipe 200 and is controlled by a solenoid 210 which is in turn controlled by relay 212 which responds to conductivity of the material in chamber 164 as detected by wires 214.

Figure 4:
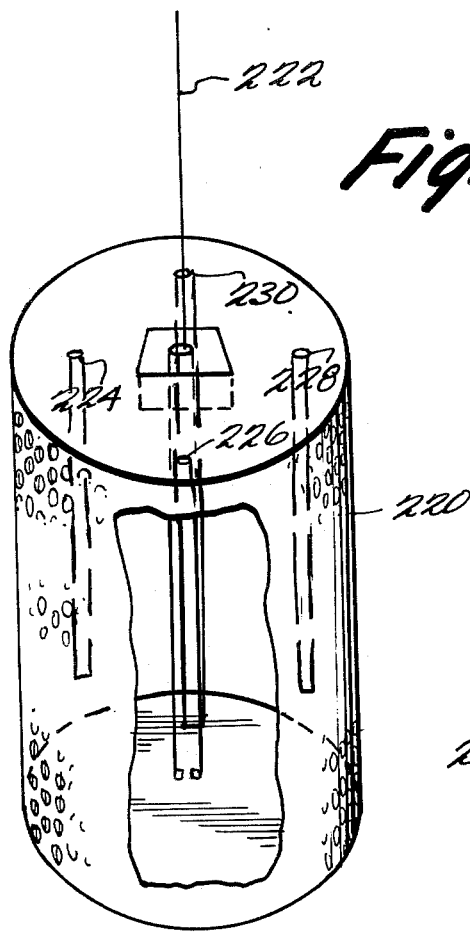
FIG. 4 shows a further embodiment of this invention which can be placed directly in a tank car or the like to effect separation of the oil and water.

Referring to FIG. 4, an embodiment is illustrated in which separator tank 220 can be simply lowered into a tank truck or other large container of a raw oil mixture. The walls of tank 220 are porous so that the raw mixture can flow into separator tank 220 and the separated oil and water can leave through pores. Once separated, of course, the water will settle to the bottom of the larger storage tank whereas the oil will rise to the top. Eventually the raw mixture will be substantially separated.

For providing the electrical field of causing separation, a center electrode 222 extends into tank 220 and is surrounded by a plurality, in this embodiment four circumferentially disposed electrodes 224, 226, 228 and 230. A high voltage is thus generated between the center electrode 222 and the circumferentially disposed electrodes 224, 226, 228 and 230.

Figure 5:
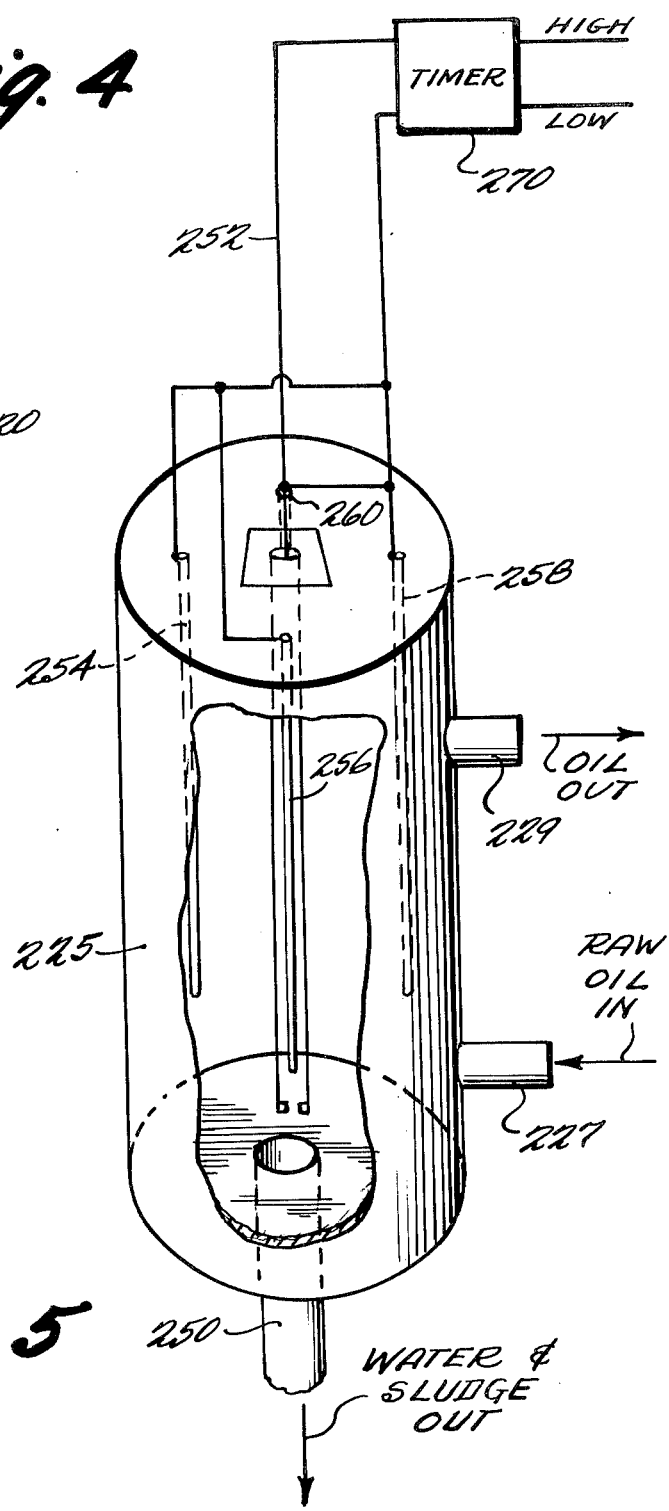
FIG. 5 shows a further embodiment which can be placed in a feed line from a pump with the oil, minus the removed water, circulated back to a storage tank.

Reference is now made to FIG. 5 which shows yet another embodiment in which a separation tank 225 can be disposed in a feed line from a pump connected to a tank car or storage tank. The raw mixture is received at inlet 227 and the separated oil leaves the separator tank 225 at outlet 229. The water and sludge leave, as in the other embodiments, from outlet 250. As in the arrangement of FIG. 4, a center electrode 252 is surrounded by four circumferentially disposed electrodes 254, 256, 258 and 260 so that a potential field is generated between center electrode 252 and circumferentially disposed electrodes 254, 256, 258 and 260. The center electrode and circumferentially disposed electrodes are connected to a conventional timer unit 270 which periodically switches the voltage from a high to a low level.

Many changes and modifications in the above described embodiment of the invention can, of course, be carried our without departing from the scope thereof. Accordingly, that scope is intended to be limited only by the scope of the appended claims.

What is claimed is:

1. Apparatus for separating oil from water in a raw mixture comprising:
    a separator tank having an oil outlet disposed near the top thereof, a water outlet disposed near the bottom thereof and a raw mixture inlet disposed between said water outlet and oil outlet,
    a plurality of electrodes disposed in said tank between said raw mixture inlet and said oil outlet for applying an electrical potential to separate said oil from said water, comprising first and second bars extending across said tank near the top thereof, a plurality of first wires suspended therefrom, third and fourth bars extending across said tank near the top thereof and separated from said first and second bars, a plurality of second wires having a length greater than said first wires suspended therefrom,
    means for applying a first AC voltage between the first wires suspended from said first bar and from said second bar and applying a second AC voltage between said second wires suspended from said third bar and from said fourth bar, said first AC voltage being higher than said second AC voltage,
    means for sensing the conductivity of the liquid at a location adjacent the bottom of said tank,
    an outlet pipe connected to said water outlet,
    valve means in said outlet pipe for controlling flow through said outlet pipe, and
    means connected to said valve means and said sensing means for opening said valve means when the sensed conductivity is greater than a given value and closing said valve means when the sensed conductivity is less than said value.

2. Apparatus as in claim 1 wherein said second voltage is between 220 and 440 volts A.C. and said first voltage is between 3,000 and 6,000 volts A.C.

3. Apparatus as in claim 1 wherein said water outlet is disposed in the bottom of said tank and said raw mixture inlet is disposed about 1/4 of the way between the bottom and the top of said tank.

4. Apparatus as in claim 1 wherein said bars are plastic and extend parallel to each other in a horizontal plane.

5. Apparatus as in claim 1 further including a raiser pipe connected to said water outlet.

6. Apparatus as in claim 1 wherein said opening means includes a relay connected to said sensing means for shifting its output condition when said sensing means senses greater than said given value, and a pull solenoid connected to said valve means for opening said valve means when said relay shifts its output condition.

7. Apparatus as in claim 1 further including a screen over said water outlet for blocking movement of sludge particles out of said water outlet.

* * * * *